Patented July 14, 1925.

1,546,240

UNITED STATES PATENT OFFICE.

WILLIAM C. JONSON, OF NORTH YAKIMA, WASHINGTON, ASSIGNOR TO JONSON'S EUREKA COMBINATION SPRAY CO., A CORPORATION OF WASHINGTON.

INSECTICIDE.

No Drawing. Application filed April 18, 1922. Serial No. 555,240.

*To all whom it may concern:*

Be it known that I, WILLIAM C. JONSON, a citizen of the United States, and a resident of North Yakima, in the county of Yakima and State of Washington, have invented a new and useful Insecticide, of which the following is a specification.

My invention is an insecticide and its principal object is to provide an insecticide spray or bath for trees, shrubbery and other plants which will kill insects such as green aphis, wooly aphis, red spider, leaf roller, San José scale and coddling moth as well as destroy the eggs thereof.

Further, the invention contemplates an insecticide of this character which will not in any way injure the trees, plants or the fruit thereof.

It is also an object of the invention to provide an insecticide which consists of comparatively few ingredients but which is highly effective in use.

With the preceding and other objects and advantages in mind, the invention consists of the novel combination of ingredients, the manner of mixing the same and proportions as will be hereinafter fully described and claimed.

My insecticide consists of the following: Nicotine sulphate 45.00% cyanide of sodium 12.38%; creosote 22.28%; and inert ingredients 20.34%.

Preparatory to using the insecticide one quart of the same is added to two hundred gallons of water. To this mixture five pounds of rock lime is added and the mixture thoroughly stirred to dissolve all sediment. The function of the lime is to increase the volatility of the nicotine sulfate.

In reduction to practice, I have found that the various elements necessary in the carrying of my invention into effect, and referred to in the above description, are the most effective, yet realizing that the conditions concurrent with the carrying of my invention into use will necessarily vary, I desire to emphasize the fact that certain variations from the preciseness in the various steps which I have described may be executed, when necessary, without sacrificing any of the advantages of my invention as defined in the appended claims:

1. An insecticide composition consisting of a solution of nicotine sulfate, creosote and lime in an amount to increase the volatility of the nicotine sulfate.

2. An insecticide composition consisting of a solution of nicotine sulfate, creosote, a cyanid and lime in an amount to increase the volatility of the nicotine sulfate.

WILLIAM C. JONSON.